(12) United States Patent
Wortmeyer et al.

(10) Patent No.: US 11,633,697 B2
(45) Date of Patent: Apr. 25, 2023

(54) DISPOSABLE DEVICE FOR FILTERING A LARGE MEDIUM VOLUME

(71) Applicant: Sartorius Stedim Biotech GmbH, Goettingen (DE)

(72) Inventors: Johannes Wortmeyer, Goettingen (DE); Maik Sommer, Goettingen (DE); Thomas Friese, Goettingen (DE); Thomas Loewe, Goettingen (DE)

(73) Assignee: Sartorius Stedim Biotech GmbH, Goettingen (DE)

( * ) Notice: Subject to any disclaimer, the term of this patent is extended or adjusted under 35 U.S.C. 154(b) by 316 days.

(21) Appl. No.: 16/766,805

(22) PCT Filed: Nov. 8, 2018

(86) PCT No.: PCT/EP2018/080644
§ 371 (c)(1),
(2) Date: May 26, 2020

(87) PCT Pub. No.: WO2019/101541
PCT Pub. Date: May 31, 2019

(65) Prior Publication Data
US 2021/0008498 A1 Jan. 14, 2021

(30) Foreign Application Priority Data
Nov. 27, 2017 (DE) .................... 10 2017 127 933.4

(51) Int. Cl.
*B01D 61/18* (2006.01)
*B01D 63/04* (2006.01)

(52) U.S. Cl.
CPC ........... *B01D 61/18* (2013.01); *B01D 63/046* (2013.01); *B01D 2311/2649* (2013.01);
(Continued)

(58) Field of Classification Search
CPC .............. B01D 63/046; B01D 2313/58; B01D 2315/10; B01D 2317/04
See application file for complete search history.

(56) References Cited

U.S. PATENT DOCUMENTS 5,405,528 A  4/1995  Selbie et al.
9,630,147 B2  4/2017  Collignon et al.
(Continued)

FOREIGN PATENT DOCUMENTS

CN  105311966 A  2/2016
DE  69130393 T2  5/1999
(Continued)

OTHER PUBLICATIONS

Boehm, John. "Single-Use Connections Enable Advancements in Aseptic Processing." BioProcess International 8.4 (2010): 32-35. (Year: 2010).*
(Continued)

*Primary Examiner* — Bradley R Spies
(74) *Attorney, Agent, or Firm* — Dilworth IP, LLC

(57) ABSTRACT

A single-use device for filtration of a large volume of medium including a plurality of single-use filter units, at least some of which, preferably all of which, are connected to each other by rigid pipes. The filter units include at least one prefilter and at least one main filter for virus filtration which is configured as a hollow fiber capsule.

24 Claims, 2 Drawing Sheets

(52) U.S. Cl.
CPC ...... *B01D 2315/10* (2013.01); *B01D 2317/04* (2013.01); *B01D 2321/04* (2013.01)

(56) References Cited

U.S. PATENT DOCUMENTS

| | | | | |
|---|---|---|---|---|
| 2011/0005984 | A1* | 1/2011 | Boettcher | B01D 61/18 210/137 |
| 2015/0252934 | A1* | 9/2015 | Ohta | F16L 3/221 210/323.1 |
| 2016/0030888 | A1 | 2/2016 | Diemer et al. | |
| 2019/0083936 | A1 | 3/2019 | Loewe et al. | |

FOREIGN PATENT DOCUMENTS

| | | | | |
|---|---|---|---|---|
| DE | 202017103082 | U1 | 6/2017 | |
| EP | 2915571 | A1 | 9/2015 | |
| JP | H10219764 | A * | 8/1988 | ........... Y02A 20/152 |
| JP | 2006181469 | A | 7/2006 | |
| KR | 101337603 | B1 | 12/2013 | |
| WO | 2008039278 | A1 | 4/2008 | |
| WO | WO-2013023896 | A1 * | 2/2013 | ............. B01D 63/02 |
| WO | 2017032560 | A1 | 3/2017 | |

OTHER PUBLICATIONS

Nogami H—JP-H10219764-A machine translation—1988 (Year: 1988).*

Bolda J—WO-2013023896-A1 machine translation—2013 (Year: 2013).*

Kobayashi Y—JP-2006181469-A machine translation—2004 (Year: 2004).*

* cited by examiner

DISPOSABLE DEVICE FOR FILTERING A LARGE MEDIUM VOLUME

The invention relates to a single-use device for filtering a large volume of medium.

BACKGROUND OF THE INVENTION

In general, single-use devices are becoming increasingly widespread in the pharmaceutical production of high-quality active substances due to the high flexibility that can be achieved and the savings in time, investment and operating expenses such as cleaning and the validation and the examination thereof. Single-use devices are increasingly desired for a larger scale (processes with large volumes), wherein the costs for such systems should not rise unrealistically high.

Document WO 2017/032560 A1 shows a fully pre-sterilizable, ready-to-connect and integrity testable single-use filtration device designed for large volume filtration processes. This single-use filtration device comprises a plurality of standard size single-use filter capsules which are arranged in a predetermined grid and are connected to each other by pipes. The filter capsules are carried by a rigid holder.

The object of the invention is to provide an economical and effective single-use filtration device suitable for large-scale virus filtration.

This object is achieved by a device having the features of claim 1. Advantageous and useful configurations of the device according to the invention are specified in the sub-claims.

SUMMARY OF THE INVENTION

The single-use device according to the invention for the filtration of a large volume of medium comprises a plurality of single-use filter units, at least some of which, preferably all of which, are connected to each other by rigid pipes. According to the invention, the filter units include at least one prefilter and at least one main filter for virus filtration which is configured as a hollow fiber capsule.

In general, a prefilter always has a membrane having larger pores than a downstream main filter. A typical classification of porous membranes can be made on the basis of their pore sizes. Based on the pore size, a general distinction is made between microfiltration membranes (average pore size: 0.1 to 10 µm), ultrafiltration membranes (average pore size: 0.01 to less than 0.1 µm), nanofiltration membranes (average pore size: 0.001 to less than 0.01 µm) and reverse osmosis membranes (average pore size: 0.0001 to less than 0.001 µm) (see Shang-Tian Yang, Bioprocessing for Value-Added Products from Renewable Resources, 2007). In the field of microfiltration, the average pore size is for example determined by capillary flow porometry, (see Shrestha, Aabhash, "Characterization of porous membranes via porometry" (2012), Mechanical Engineering Graduate Theses & Dissertations, Paper 38). For the characterization of the pore size distribution of ultra and nanofiltration membranes, a similar measuring method is used with the difference that flow rates rather than gas flow rates of the displacing liquid are recorded as a function of the differential pressure increase (see R. Dávila, Characterization of Ultra and Nanofiltration Commercial Filters by Liquid-Liquid Displacement Porosimetry, 2013).

While the main filter(s) of the single-use filtration device according to the invention are configured as hollow fiber capsule(s) for virus filtration, having a typical average pore size of 0.01 to 0.1 µm, preferably 0.02 µm, pleated filter elements, flat filters, hollow fiber capsules, depth filters, etc. are considered as prefilters. The prefilter(s) can also be sterile filters having a pore size in the range of 0.1 to 8 µm, preferably 0.2 µm.

The invention is based on the findings that a combination of several single-use filter units which are rigidly tubed together can handle filtration on a large scale.

The rigid pipes, in particular a common inlet pipe and/or a common outlet pipe for several prefilters and/or a common inlet pipe and/or a common outlet pipe for several main filters of the single-use filtration unit are preferably formed by pressure-stable tubes having a defined diameter. This means that the diameter is not chosen arbitrarily and does not vary during operation due to material expansion or similar. This results in an even pressure distribution and a uniform flow velocity of the filtration medium when flowing into the filter units. This would not be the case if the filter units were connected with (thin) hoses, as typically, different hose lengths and different hose diameters would be present, the constancy of which would not be ensured during operation, especially at a high and fluctuating pressure. In addition, when using rigid distribution tubes, it is advantageous to obtain a calming of the flow and to reduce pressure surges by a common inflow volume. The reduction of pressure surges generally protects membranes having a wall thickness of less than 150 µm, which is particularly the case for the hollow fiber filter elements used for virus filtration. Due to the avoidance of pressure fluctuations obtained on the whole, a higher phage retention is reached compared to pressure pulsation-rich phage filtration processes.

Particularly preferably, the connection of prefilters and main filters is realized by a rigid tubing, especially preferably having identical internal tube diameters, within the single-use filtration device. This results in further advantages in addition to the uniform flow conditions and lower pressure fluctuations mentioned above. Overall, a compact, stable structure having less connections and less dead volume can be achieved. The device is therefore easier to handle overall.

In particular, in the single-use filtration device according to the invention, it is provided that a rigid pipe is present between the at least one prefilter and the at least one main filter.

The configuration of an inlet pipe to the at least one main filter as a rigid pipe is also particularly preferred.

For the preferred application of virus filtration, a structure is provided in which the at least one prefilter and the at least one main filter are connected in series. In the case of a plurality of prefilters or main filters, several prefilters are connected as a group in series with a group of main filters.

With regard to the unproblematic integration of the single-use filtration device according to the invention into a process chain, the device has both a common inlet connection and a common outlet connection for the filtration medium and is adapted to be integrated into an existing filtration branch of a process arrangement by sterile connectors.

For most applications, it is practical to respectively combine the prefilters and the main filters and to expose them to a flow simultaneously as a group, i.e. the filter units and the rigid pipes are arranged such that all prefilters and all main filters are respectively exposed to a flow parallel to each other.

According to a preferred embodiment, the prefilters are designed for dead-end filtration and the main filters for cross-flow filtration. In principle, however, there is the possibility both for the prefilters and the main filters to choose a dead-end filtration configuration or cross-flow filtration configuration therefor.

According to a further development of the invention, the rigid pipes between the filter units provided according to the invention may also be formed by common housings of the filter units. This means that no separate pipes are provided between specific filter units, but that the filter units are combined into one modular unit.

At least one filter unit can be configured as a multiple capsule having at least two filter elements which are installed in a common housing. The filter elements in the multiple capsule can be identical or differ from each other. The use of such multiple capsules reduces the number of connections required within the single-use filtration device according to the invention and the area occupied within a production room for the installation of the device.

Within a multiple capsule, the filter elements present therein may be arranged either such that they are exposed to a flow parallel to each other or such that they are sequentially exposed to a flow. The first arrangement is recommended for filter elements of the same type, which all serve for pre-filtration or all for main filtration. The second arrangement is recommended for filter elements of different types, if one type is intended for pre-filtration and the other for main filtration within the same capsule.

In particular, a prefilter and a main filter can be combined in a multiple capsule, with the multiple capsule including at least one pleated filter element (prefilter) and one hollow fiber filter element (main filter). However, as indicated above, two or more pleated filter elements can also be provided as multiple prefilters within a capsule, which is then connected to a hollow fiber capsule via a rigid connecting pipe. It is also possible that several hollow fiber elements are arranged in a capsule, each of which serves as a prefilter or each of which serves as a main filter or at least one of which serves as a prefilter and at least one of which serves as a main filter. As explained at the beginning, a sterile filter can also be installed as a prefilter in the multiple capsule, so that for a stepwise filtration, for example, the combination of (pleated or hollow fiber) prefilter, sterile filter and main filter can be installed within one capsule.

In a further preferred embodiment, specific filter units, in particular a group of main filters and/or a group of prefilters, are each configured as a module. The modular design permits the simple insertion or replacement of an entire filter group. It is also possible to test the integrity of a group of filters at once, more specifically inside the device or outside (offline).

According to a preferred design, a common vent pipe which preferably leads to a sterile air filter is provided for all or at least for a group of filter units. Via the sterile air filter, a test gas can be pumped in the reverse direction to the filter units in order to subject them jointly to an integrity test.

To protect the sterile air filter against blocking due to undesired contact with liquid, it may be provided that a pressure-stable sight glass is integrated into the common vent pipe. The sight glass allows a visual check of correct venting and can also be used to indicate the level in the filter unit(s). The established term "sight glass" generally refers to a transparent tube section and is not to be understood as restricting the choice of material. In addition to real glass, a transparent plastic can also be used for the pressure-stable design of the tube section. A further or complementary solution for making liquid visible in the vent pipe is to place an indicator which reacts to water in the vent pipe, e.g. by a clearly visible change in color. An additional protective filter can also be interposed before the inlet of the sterile air filter to protect the sterile air filter and prevent the passage of water.

A vent valve provided in the vent pipe or on the sterile air filter can be released after filtration, so that part of the remaining unfiltrate can still pass through the filter units due to the static pressure caused by its own weight and can thus increase the filtrate quantity, the opened vent valve allowing a subsequent flowing of sterile air.

In this connection, in order to permit purposeful integrity checks for individual filter units or specific groups of filter units within the device, at least one shut-off valve may be provided between the filter units, in particular between the prefilters and the main filters.

Preferably, at least one filter unit of the single-use filtration device according to the invention, preferably all main filters, are oriented such that they are exposed to a flow from bottom to top. Such an exposure of the filter unit to a flow ensures uniform hydrostatic conditions, which in turn results in a homogenization of filtration and thus in an improvement in phage retention.

In a preferred configuration of the filter units, in particular of the main filters, a lower unfiltrate inlet and a lower filtrate outlet, and an upper filtrate outlet and an upper vent connection are respectively provided. One of the two filtrate outlets can be used to discharge a flushing or wetting medium or to feed a test gas within the scope of an integrity test.

The provision of valves for blocking the lower unfiltrate inlets and for blocking the vent connections is advantageous for a purposeful test of individual filter units or groups of filter units for integrity. The filter units not to be tested are excluded by appropriate valve positions. The test is performed via a filtrate outlet, for example.

With regard to a clear arrangement of the valves and simple operability, it is advantageous to arrange the majority of the valves on the same side of the single-use filtration device.

A flow-reducing element can be provided at an outlet of a filter unit or a group of filter units to produce a differential pressure for a flushing process. Such a flushing process is useful within the scope of an integrity test to ensure sufficient wetting of the filter membranes.

A further development of the single-use filtration device according to the invention provides for an additional connection on the filtrate side of the device to which a sterile air filter can be connected. Gas can be pumped through this sterile air filter after completion of a filtration process to remove any filtrate remaining in the device. A complete emptying of the device is of particular interest because the unused product solution that would otherwise remain in the device can have a considerable value (in the range of 500 to 5,000 €/l). During regular filtration operation, the additional connection to the sterile air filter is protected from contact with the filtration medium by a valve or the like.

Irrespective of the latter sterile air filter, the previously mentioned sterile air filter is usually provided on a common vent pipe (possibly with the interposition of a further (hose) pipe) in order to pump in a sterile test gas for performing an integrity test. The sterile air filter can also be protected by a valve on the vent pipe or on the sterile air filter itself.

According to a further preferred embodiment, the pipes towards the filter units, away from the filter units or between the filter units are configured as to be adapted to be separated in a sterile manner. It is thus possible, for a proper disposal, to separate handy segments from the single-use filtration device, which can then be carried individually and placed individually in an autoclave.

BRIEF DESCRIPTION OF THE DRAWINGS

Further features and advantages of the invention will become apparent from the description below and from the attached drawings to which reference is made. In the drawings.

DETAILED DESCRIPTION OF THE INVENTION

Figure 2:
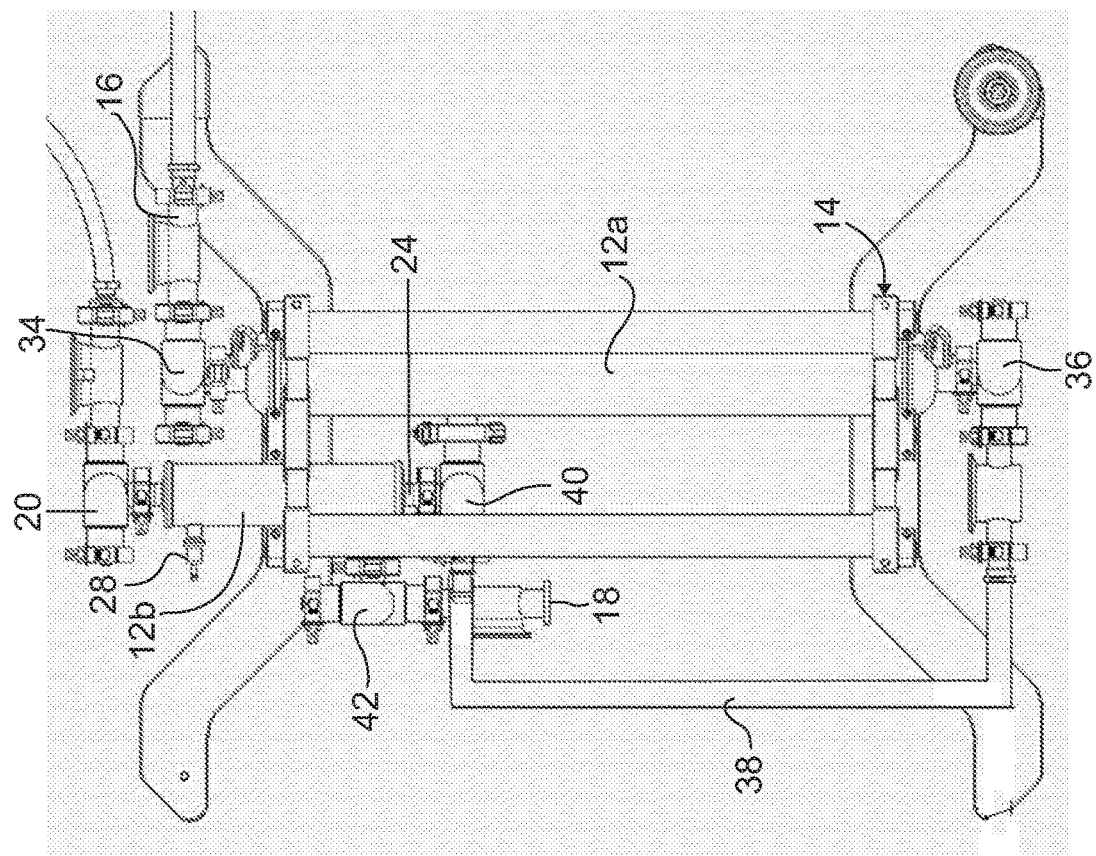
FIG. 2 shows a side view of the device of FIG. 1.
Figure 1:
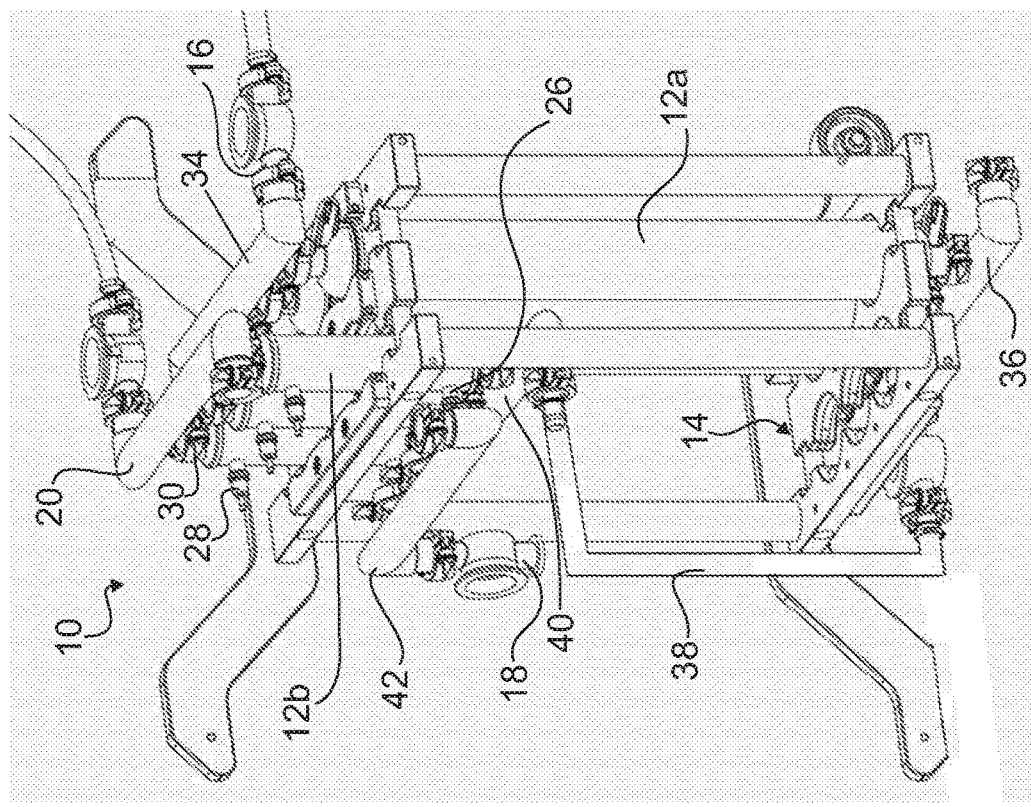
FIG. 1 shows a perspective view of a single-use filtration device according to the invention.

FIGS. 1 and 2 show a single-use filtration device 10 comprising a plurality of filter units 12, here in the form of filter capsules. The filter units 12 are held in position by a rigid holder 14 (rack) in a predetermined arrangement (grid).

At least one unit of the filter units 12 is a hollow fiber capsule for virus filtration (hereinafter only referred to as main filter 12b for the sake of simplicity). At least one filter unit 12 is used for pre-filtration (hereinafter only referred to as prefilter 12a for the sake of simplicity). Preferably, the prefilters 12a contain pleated filter elements, although other configurations are also possible. Optionally, sterile filters can also be provided for a stepwise filtration.

Preferably, the ratio of the number of prefilters 12a to main filters 12b is 1:1. Other ratios, in particular of 1:2, 2:1; 1:3, 3:1, may also be useful depending on the respective circumstances (size, arrangement of the filters etc.). The effective filter surfaces of the prefilters 12a and the main filters 12b can also be used for optimum filtration conditions, wherein the same preferred ratios apply.

The single-use filtration device 10 has a common inlet connection 16 (unfiltrate side) and a common outlet connection 18 (filtrate side) for all filter units 12, so that it can be integrated into a filtration branch.

Within the device 10, the filter units 12 are completely or at least largely connected to each other by rigid, pressure-stable pipelines having a defined diameter. The rigid pipelines ensure a uniform flow behavior without pressure fluctuations during operation. The course of the pipelines is determined by the intended operation of the single-use filtration device 10 (parallel and/or series connection of all or of specific filter units 12), wherein the pipelines have the necessary branches to the individual filter units 12. Where necessary, the pipelines are attached to the holder 14.

In the example embodiment shown in FIGS. 1 and 2, prefilters 12a and main filters 12b of different sizes are arranged in the stable holder 14 (rack). In particular, the main filters 12b are each configured as upright filter capsules having an unfiltrate inlet 24 on the lower front side of the filter capsule and two filtrate outlets 26, 28 which are internally connected to each other and one of which is located at the lower end and one at the upper end of the filter capsule. Only one filtrate outlet is required for the filtration itself. The purpose of the additional, optional filtrate outlet will be explained later.

The medium to be filtered flows from the inlet connection 16 through a common prefilter inlet pipe 34, which is configured as a rigid distribution tube having a defined diameter and branches to the prefilters 12a. The prefilter inlet pipe 34 distributes the medium in parallel to all prefilters 12a. After having passed through the prefilters 12a, the prefiltered medium is collected in a common prefilter outlet pipe 36, which in turn is configured as a rigid collecting tube having a defined diameter and branches to the prefilters 12a.

The prefiltered medium passes from the prefilter outlet pipe 36 via a further rigid connecting pipe 38 to a common main filter inlet pipe 40, which is configured as a rigid distribution tube having a defined diameter and branches to the main filters 12b. The main filter inlet pipe 40 distributes the medium in parallel to all main filters 12b. After having passed through the main filters 12b, the filtered medium flows out of the lower filtrate outlets 26 and is collected in a common main filter outlet pipe 42, which in turn is configured as a rigid collecting tube having a defined diameter and branches to the main filters 12b. The filtrate finally flows out of the device 10 through the outlet connection 18.

A common main filter outlet pipe (not shown here), which is configured as a rigid collecting tube having a defined diameter can also be provided for the upper filtrate outlets 28.

The main filters 12b with their unfiltrate inlets 24 and the pipelines are oriented such that the flow passes through the main filters 12b from bottom to top, which ensures uniform hydrostatic conditions.

Both the prefilters 12a and the main filters 12b are designed for dead-end filtration. However, it is also possible that the prefilters 12a are designed for dead-end filtration and the main filters 12b for cross-flow filtration. The longer service life of cross-flow filters compared to dead-end filters is important especially for virus filtration.

The filter units 12 can be configured as multiple capsules. This means that several similar or different filter elements are accommodated in a common or in several rigidly connected housings. The filter elements within the multiple capsule can be exposed to a flow in parallel or sequentially, depending on their design. In particular, two or more hollow fiber capsules can be accommodated in one housing. In a further configuration, a multiple capsule is provided which has at least one pleated filter element and one hollow fiber filter element. The multiple capsules can generally be configured as a main filter 12b or as a prefilter 12a. A combination of prefilter 12a and main filter 12b within a multiple-capsule housing is also possible.

The main filters 12b have vent connections 30 on their upper front side, which open into a common vent pipe 20. The vent pipe 20 is configured as a rigid collecting tube having a defined diameter and branches to the main filters 12b. The vent pipe 20 leads to a sterile air filter 22 (not shown in FIGS. 1 and 2), if necessary via a further (hose) pipe.

The common vent pipe 20 may contain a pressure-stable sight glass upstream of the sterile air filter 22 in flow direction. The sight glass makes medium rising to the sterile air filter 22 visible for the user. This enables a visual check of the correct venting, so that the user, if necessary, can take appropriate measures in due time before the sterile air filter 22 may come into contact with any liquid and is therefore blocked. This can especially happen when liquid forms a kind of film on a nonwoven supporting the membrane of the sterile air filter 22. The sight glass can also be used to monitor the level in the filter unit(s) 12.

For the same purposes, an indicator which reacts to water can be placed in the vent pipe 20 as an alternative or in addition to the sight glass. Such water contact indicators are available as adhesive tapes, which turn red on contact with water, or based on blue gel (silica gel), which turns pale pink. A further protective measure is a protective filter which is arranged in front of the sterile air filter 22 and which is configured as a flat filter without supporting nonwoven or similar. The air filter membrane of the protective filter can be made of polyvinylidene fluoride (PVDF), polyethylene (PE), hydrophobic polyethersulfone (PESU) or polytetrafluoroethylene (PTFE). Since the protective filter has no supporting nonwoven, the risk of blocking is minimized.

The sterile air filter 22 can also be used as a test gas inlet within the scope of an integrity test, as will be described below.

All or specific filter units 12, in particular the main filters 12b and the prefilters 12a, each form a module, so that an integrity test for an entire module can be performed inside the single-use filtration device 10, but also outside the single-use filtration device 10 (offline).

Shut-off valves can be provided between the filter units 12, so that connections between specific filter units 12 can be shut off in a purposeful manner. This permits a purposeful sterile venting or a purposeful sterile integrity test of a single filter unit 12 or of a group of interconnected filter units 12, e.g. all prefilters 12a and all main filters 12b.

When performing an integrity test, individual filter units 12, one or several groups of filter units 12 or all filter units 12 installed in the device 10 may be tested together.

A test of all main filters 12b in one test step to save costs and time is preferred. For this purpose, test gas is supplied from the unfiltrate side through the vent pipe 20 via a sterile air filter 22 (see FIG. 3). For this test, only one valve on the prefilter outlet pipe 36 of the device 10 needs to be closed.

When testing individual main filters 12b separately via the unfiltrate-side sterile air filter 22, valves (not shown) are provided for each vent connection 30 and for each unfiltrate inlet 24 to selectively block and unblock the connections or inlets. The valves are switched depending on the main filter 12b to be tested.

If all filter units, including the prefilters 12a are to be tested, it is also possible to pump the test gas into the unfiltrate inlet connection 16 of the device 10 instead of introducing the test gas through the vent pipe 20. For this purpose, a sterile air filter is connected to the inlet connection 16 through which the test gas passes before it enters the filter units 12 through the unfiltrate inlets 24.

It is also possible to test the filter units 12 together or individually by pumping the test gas via a sterile air filter through the upper filtrate outlets 28 into the single-use filtration device 10. For this purpose, all upper filtrate outlets 28 are connected to the test gas during a joint test, if necessary via a collecting tube connected to these outlets, or only to one of the upper filtrate outlets 28, while the remaining filtrate outlets 28 are closed by a valve (not shown). The lower filtrate outlets 26 must be closed by valves (not shown) depending on the type of test (common or individual test).

The most important valves, preferably all valves required to operate the single-use filtration device 10 are located on the same side of the single-use filtration device 10, which provides an improved overview and simplified operability.

Before performing an integrity test, it may be advantageous to flush the filter units 12, in particular the main filters 12b with a wetting medium at a differential pressure. This ensures sufficient wetting for the integrity test. In order to regulate only the inlet pressure, a flow-reducing element is provided at the outlet of the respective filter unit 12 or filter unit group, which allows only a low flow and thus creates a differential pressure. The respective flow-reducing element must be adapted to the size and number of filter units 12 to be flushed. For example, different resistances are required for a device having three, six or nine (main) filter units 12. Such a flow-reducing element is typically designed for a specific field of application, for example for a combination of four to six filter units 12 of a specific type. For a different number of such filter units 12 (e.g. two or seven), a correspondingly differently designed flow-reducing element must then be provided.

One possibility for variable adjustment is to use hoses of different lengths at the outlet of the filter units 12 to be flushed. The resistance generated by the hose (friction of the liquid against the inner surface of the hose) can be adjusted by modifying the length of the hose. A further possibility to make the flow for a flushing process variable is to design the flow reducing element as a (proportional) valve, for example in the form of a pinch or diaphragm valve.

Figure 3:
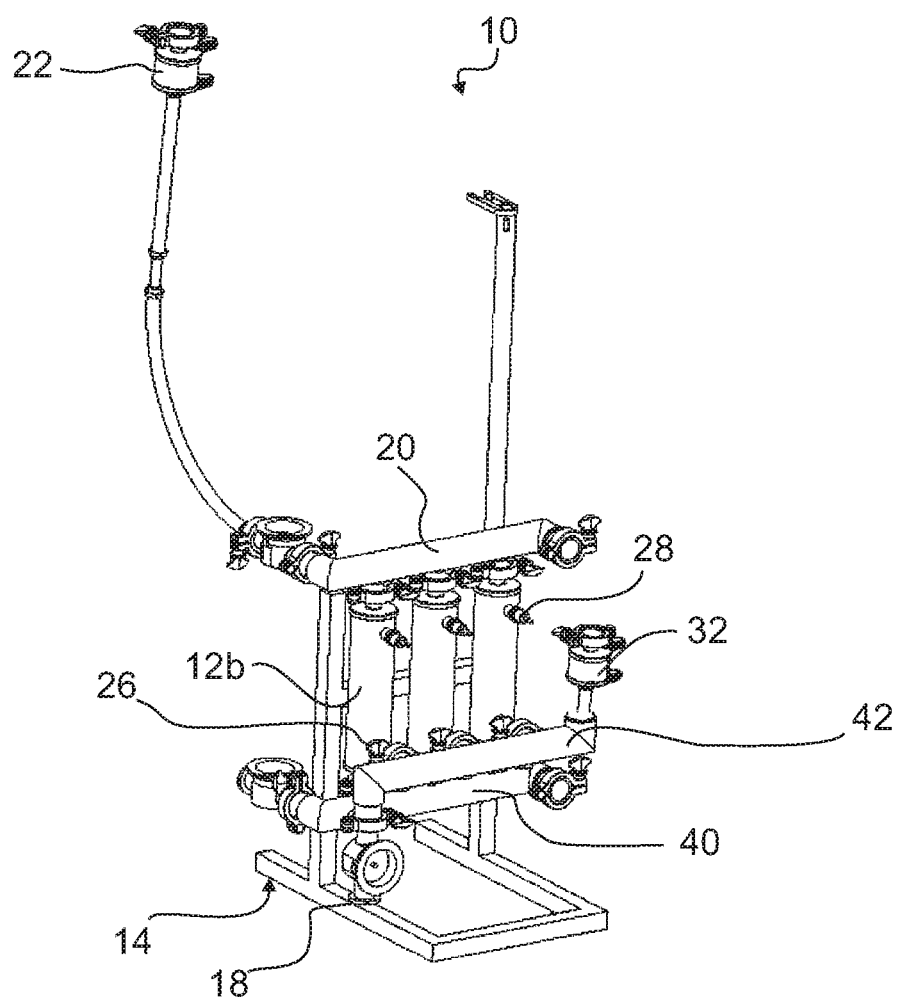
FIG. 3 shows a perspective view of a part of a single-use filtration device according to the invention with an additional air filter.

FIG. 3 shows part of an embodiment of the single-use filtration device 10, in which only main filters 12b are shown for a better clarity. However, the unfiltrate-side sterile air filter 22 connected to the common vent pipe 20 via a hose pipe is illustrated here. After filtration, a vent valve provided in the vent pipe 20 or on the sterile air filter 22 can be released so that sterilized air can flow through the sterile air filter 22 to the filter units 12. It is thus possible that a part of the remaining unfiltrate can pass through the filter (elements) of the filter units 12 by its own weight due to the static pressure and can thus increase the filtrate quantity. This is promoted by the preferred vertical installation of the filter (elements) in the filter units 12.

Furthermore, in the embodiment shown in FIG. 3, a further filtrate-side sterile air filter 32 is provided on an additional connection on the filtrate side of the device 10, more precisely on the main filter outlet pipe 42. Due to this filtrate-side sterile air filter 32, sterile gas can be pumped after completion of the filtration to discharge the filtrate remaining in the device 10 through the outlet connection 18. During the preceding filtration, the unfiltrate-side sterile air filter 32 is blocked by a valve, so that a fluid contact of the medium (product solution) with the filtrate-side sterile air filter 32 is excluded.

In principle, each of the rigid, pressure-stable pipelines of the device 10 can be equipped with an sight glass. Therefore, it is for example possible to visually monitor levels and sufficient venting in the common prefilter inlet pipe 34 of the common main filter outlet pipe 42.

It is necessary for all embodiments that the materials used in the single-use filtration device 10 (also for any flexible hose pipes etc.) can be sterilized, in particular by gamma radiation, heat or gassing, or can be autoclaved. The single-use filtration device 10 can thus be sterilized and packaged in a pre-assembled, i.e. ready-to-connect state, or first packaged and sterilized together with the packaging. After delivery to a customer, the entire single-use filtration device 10 can be installed there in an existing filtration branch using sterile connectors, i.e. it is immediately ready for use.

In order to enable a proper disposal of the single-use filtration device 10, which includes a sterilization step in an autoclave, the filter units 12 are connected to each other in the device 10 such that they can be separated from each other without much effort. The separation is preferably performed in a sterile manner by the product Quickseal® (Aseptic Tube Sealing System) to avoid contamination. For disposal, the size and weight of the separated segments are selected so that they can be carried by one person and transferred to an autoclave. Each separated filtration segment has at least one valve that can be opened during autoclaving to prevent overpressure in the filtration segment during sterilization.

LIST OF REFERENCE NUMBERS 10 single-use filtration device
12 filter units
12a prefilter
12b main filter
14 holder
16 inlet connection of the single-use filtration device
18 outlet connection of the single-use filtration device
20 vent pipe
22 unfiltrate-side sterile air filter
24 unfiltrate inlet of a filter unit
26 lower filtrate outlet of a filter unit
28 upper filtrate outlet of a filter unit
30 vent connection of a filter unit
32 filtrate-side sterile air filter
34 prefilter inlet pipe
36 prefilter outlet pipe
38 connection pipe
40 main filter inlet pipe
42 main filter outlet pipe

The invention claimed is:

1. A single-use filtration device for filtering a large volume of medium, comprising:
a plurality of single-use filter units, at least some of which are connected to each other by rigid pipes, the filter units including a plurality of prefilters and a plurality of main filters for virus filtration which are configured as hollow fiber capsules;
a common outlet pipe for the plurality of prefilters;
at least one shut-off valve between the prefilters and the main filters in the common outlet pipe allowing a grouping of all of the plurality of main filters separate from the prefilters,
the plurality of main filters having vent connections on their upper front sides opening into a common vent pipe which leads to an unfiltrate-side sterile air filter, configured so that test gas can be supplied via the sterile air filter through the common vent pipe to all of the plurality of main filters to jointly test integrity of the plurality of main filters.

2. The single-use filtration device according to claim 1, characterized in that a rigid pipe is provided between the at least one prefilter and the at least one main filter.

3. The single-use filtration device according to claim 1, characterized in that an inlet pipe to the at least one main filter is configured as a rigid pipe.

4. The single-use filtration device according to claim 1, characterized in that the at least one prefilter and the at least one main filter are connected in series.

5. The single-use filtration device according to claim 1, characterized in that the rigid pipes are formed by pressure-stable tubes having a defined diameter.

6. The single-use filtration device according to claim 1, characterized in that it has both a common inlet connection and a common outlet connection for the medium and is adapted to be integrated into a filtration branch by sterile connectors.

7. The single-use filtration device according to claim 1, characterized in that the filter units and the rigid pipes are arranged such that all prefilters and the main filters are each exposed to a flow in parallel.

8. The single-use filtration device according to claim 1, characterized in that the prefilters are designed for dead-end filtration and the main filters for cross-flow filtration.

9. The single-use filtration device according to claim 1, characterized in that some of the rigid pipes are formed by common housings of filter units.

10. The single-use filtration device according to claim 1, characterized in that at least one filter unit is configured as a multiple capsule having at least two identical or different filter elements installed in a common housing.

11. The single-use filtration device according to claim 10, characterized in that the filter elements are arranged so as to be exposed to a flow in parallel.

12. The single-use filtration device according to claim 10, characterized in that the filter elements are arranged so as to be sequentially exposed to a flow.

13. The single-use filtration device according to claim 10, characterized in that the multiple capsule includes at least one pleated filter element and one hollow fiber filter element.

14. The single-use filtration device according to claim 1, characterized in that a group of main filters and/or a group of prefilters, are each configured as a module.

15. The single-use filtration device according to claim 1, characterized in that a pressure-stable sight glass is integrated into the vent pipe and/or in that at least one indicator which reacts to water is arranged in the vent pipe and/or in that a protective filter for protecting the air filter is interposed between a vent connection and an inlet of the air filter.

16. The single-use filtration device according to claim 1, characterized in that a releasable vent valve is provided in the vent pipe or on the sterile air filter.

17. The single-use filtration device according to claim 1, characterized in that at least one filter unit, are oriented so as to be exposed to a flow from bottom to top.

18. The single-use filtration device according to claim 17, characterized in that at least one filter unit includes a lower unfiltrate inlet and a lower filtrate outlet, and an upper filtrate outlet and an upper vent connection.

19. The single-use filtration device according to claim 18, characterized in that valves are provided for blocking the lower unfiltrate inlets and for blocking the vent connections.

20. The single-use filtration device according to claim 1, characterized in that a flow-reducing element is provided at an outlet of a filter unit or a group of filter units to produce a differential pressure for a flushing process.

21. The single-use filtration device according to claim 1, characterized by a connection on a filtrate side of the device to which a filtrate-side sterile air filter can be connected through which gas can be pumped after completion of a filtration for discharging filtrate remaining in the device.

22. The single-use filtration device according to claim 1, characterized by a valve for blocking the vent pipe or the unfiltrate-side sterile air filter connected thereto.

23. The single-use filtration device according to claim 1, characterized in that pipes towards the filter units, away from the filter units or between the filter units are configured so as to be adapted to be separated in a sterile manner.

24. A method of performing an integrity test in a single-use filtration device for filtering a large volume of medium, the single-use filtration device comprising a plurality of prefilters, a plurality of main filters for virus filtration which are configured as hollow fiber capsules, and a common outlet pipe for the plurality of prefilters, a shut-off valve being provided between the prefilters and the main filters in the common outlet pipe, the plurality of main filters having vent connections on their upper front sides opening into a common vent pipe which leads to an unfiltrate-side sterile air filter, the method comprising steps of:
- grouping all of the plurality of main filters independently of the plurality of prefilters by closing the shut-off valve to shut off the plurality of main filters from the plurality of prefilters, and
- supplying a test gas via the sterile air filter through the common vent pipe to all of the plurality of main filters.

* * * * *